United States Patent
Bodin et al.

[19]

[11] Patent Number: 6,029,986
[45] Date of Patent: Feb. 29, 2000

[54] STEERING KNUCKLE

[75] Inventors: Jan-Olof Bodin, Alingsås; Ingemar Dagh, Hisings Backa, both of Sweden

[73] Assignee: AB Volvo, Gotheburg, Sweden

[21] Appl. No.: 09/051,227

[22] PCT Filed: Oct. 9, 1996

[86] PCT No.: PCT/SE96/01285

§ 371 Date: Apr. 6, 1998

§ 102(e) Date: Apr. 6, 1998

[87] PCT Pub. No.: WO97/13674

PCT Pub. Date: Apr. 17, 1997

[30] Foreign Application Priority Data

Oct. 11, 1995 [SE] Sweden .................................. 9503542

[51] Int. Cl.$^7$ ................................................ B60G 25/00
[52] U.S. Cl. ...................................... 280/93.512; 301/132
[58] Field of Search ............................. 280/93.512, 89.1, 280/FOR 105, FOR 110, 124.125; 301/132

[56] References Cited

U.S. PATENT DOCUMENTS

| | | | |
|---|---|---|---|
| 2,094,945 | 10/1937 | Hesselrode | 280/43.512 |
| 3,288,485 | 11/1966 | White et al. | 280/93.512 |
| 4,798,394 | 1/1989 | Pollock et al. | 280/93.512 |
| 5,188,382 | 2/1993 | Seiler | 280/93.512 |
| 5,413,365 | 5/1995 | Bodin et al. | 280/93.512 |

FOREIGN PATENT DOCUMENTS 37 34 503  4/1988  Germany .

*Primary Examiner*—Christopher P. Ellis
*Attorney, Agent, or Firm*—Young & Thompson

[57] ABSTRACT

Steering axle arrangement for non-driven steerable vehicle wheel, comprising a kingpin (3), on which a steering knuckle (12) is mounted in upper and lower taper roller bearings (17,18). The bearings are preloaded against bearing seats (20, 22) in the steering knuckle yoke arms (13, 14) by means of upper and lower nuts screwed onto the kingpin ends. The nuts press against the inner rings (23,25) of the bearings.

4 Claims, 1 Drawing Sheet

STEERING KNUCKLE

BACKGROUND OF INVENTION

The present invention relates to a steering axle arrangement for a non-driven steerable vehicle wheel, comprising a kingpin with a middle portion, which is fixed in a bore in an axle member, and with cylindrical ends extending above and below upper and lower surfaces of the axle member, a steering knuckle provided with an axle end for a wheel hub, and upper and lower taper roller bearings received in upper and lower bearing seats in the steering knuckle, in which said roller bearings cylindrical ends are mounted.

The most common type of steering axle arrangements for trucks has the steering knuckle itself mounted in a taper roller bearing at the upper end of the kingpin and in a journal bearing at its lower end. The upper bearing takes up both axial and radial forces, while the lower bearing only takes up radial forces. In such a steering axle arrangement, the axial forces on the upper bearing are dependent on the load, i.e. the axial load on the bearing varies with the gross weight of the vehicle. When taking a curve with a heavy load, the radial forces on the lower bearing can be so great that a certain gap will arise.

U.S. Pat. No. 4,798,394 describes a steerable axle assembly of the type described by way of introduction which also has a lower kingpin bearing in the form of a taper roller bearing which takes up both axial and radial forces. The taper roller bearings are preloaded with their bearing rings against an upper and a lower surface of the axle member. The outer ring of the lower bearing rests against a spacer ring which is held in place by a cover fixed by a number of screws. The preloading is regulated by an upper tightening screw which, via a washer, loads the inner ring of the upper bearing against the axle member. A design with preloaded roller bearings has the advantage that the bearing of the steering axle can be made entirely independent of load, so that variations in the gross weight of the vehicle only result in a redistribution between the axial forces on the bearings. More specifically, an increase in the load on the axle member, resulting in an increase in the axial forces on the upper bearing, will result in a corresponding reduction in the axial preloading in the lower bearing, whereby the level of friction in the bearing as a whole will be independent of load.

SUMMARY OF INVENTION

The purpose of the present invention is to achieve a steering axle arrangement of the type described by way of introduction which, for a given kingpin and bearing dimension, can take up greater lateral forces than the described known steering axle arrangement and which also is simpler to manufacture and assemble than said known arrangement.

This is achieved according to the invention by virtue of the fact that the steering knuckle has an upwardly facing supporting surface for the outer ring of the upper bearing and a downwardly facing supporting surface for the outer ring of the lower bearing, and that the bearings are preloaded towards each other by means of tightening elements abutting against the inner rings and fixed to said cylindrical ends.

The arrangement according to the invention significantly extends the length of the effective moment arm of the kingpin, corresponding to the distance from an upper point of intersection between lines normal to the rotational axes of the upper bearing rollers and the longitudinal axis of the kingpin down to a lower point of intersection between lines normal to the rotational axes of the lower bearing rollers and said longitudinal axis of the kingpin, in practice by about 50% over the known arrangement, which results in lower stresses on the bearings when taking curves.

By making the ends of the kingpin with threaded portions for tightening elements in the form of nuts, the number of components will be held to a minimum and assembly and preloading will be simply performed. It can be automated with advantage since no bearing fittings or shimming of axial play is required. The preloading is set by tightening the lower nut.

BRIEF DESCRIPTION OF THE FIGURE

The invention will be described in more detail below with reference to examples shown in the accompanying drawing, where the FIGURE shows a longitudinal section through one end of an axle member and one embodiment of a steering axle arrangement according to the invention.

DETAILED DESCRIPTION OF INVENTION

Figure 1:
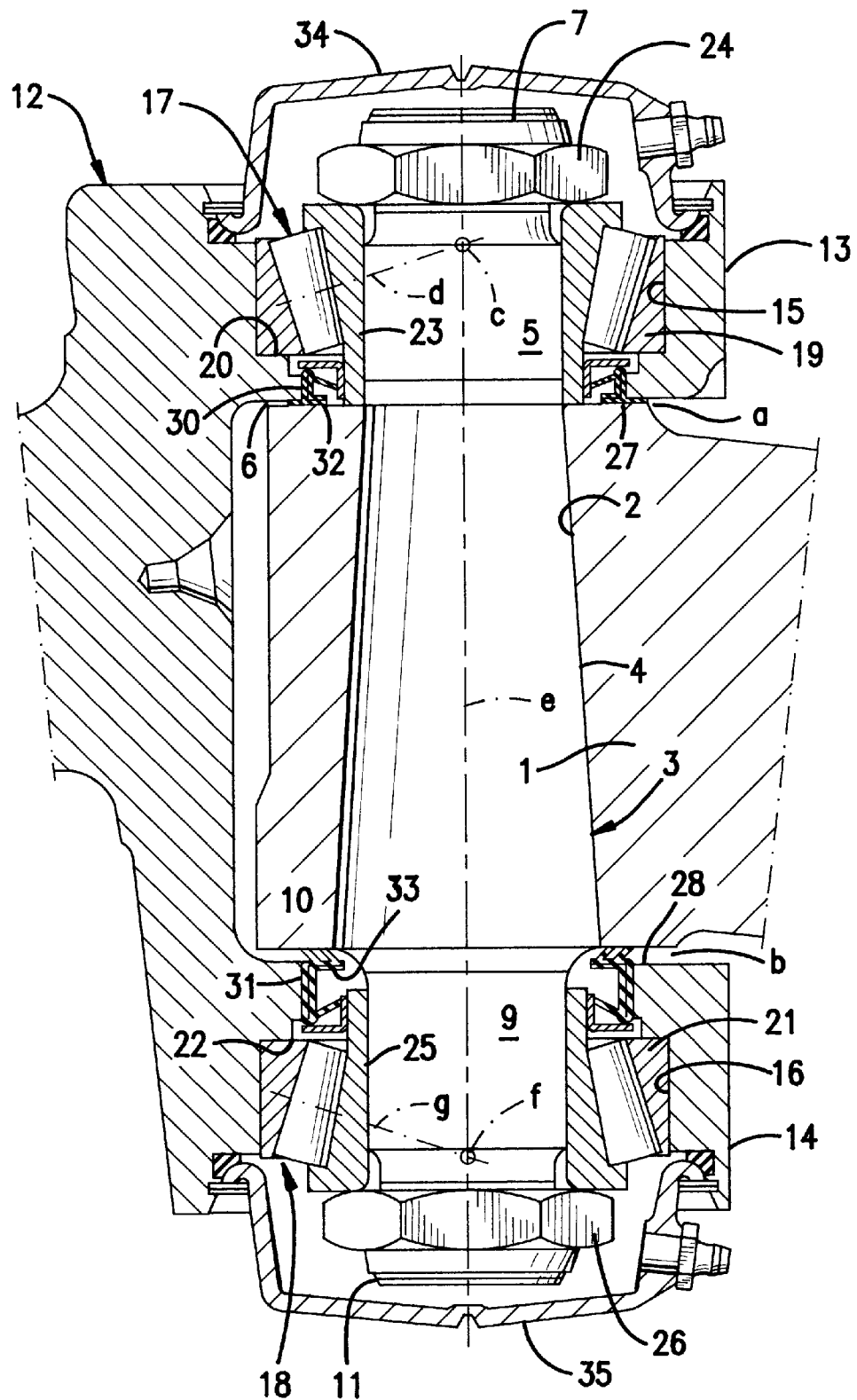

In the FIGURE, 1 designates one end of a front axle member to a motor vehicle. The axle member 1 has a bore 2 with the shape of a truncated cone. A kingpin, generally designated 3, has a middle portion 4, fixed in the bore and having the same conicity as the bore 2. An upper cylindrical end 5 extends above an upper end surface 6 of the member 1 and displays a threaded end portion 7. A corresponding lower cylindrical end 9 extends below a lower end surface 10 of the member 1 and has a threaded end portion 11.

A steering knuckle, generally designated 12, has an upper yoke arm 13 and a lower yoke arm 14, each made with an individual bearing seat 15 and 16, respectively, for upper and lower taper roller bearings 17 and 18, respectively. The upper bearing 17 rests with its outer ring 19 against an upwardly facing surface 20 in the upper bearing seat 15, while the lower bearing 18 rests with its outer ring 21 against a downwardly facing surface 22 in the lower bearing seat 16. The upper end 5 of the kingpin 1 extends into the inner ring 23 of the upper bearing 17 and is secured by means of a nut 24 screwed onto the threaded portion 7. The lower end 9 of the kingpin 1 extends in a corresponding manner into the inner ring 25 of the lower bearing 18 and is secured by means of a nut 26 screwed onto the threaded portion 11.

By tightening the nut 24 or 26, respectively, the bearing 17 or 18, respectively, is preloaded against the surfaces 20 or 22, respectively, of the bearing seat 15 or 16, respectively. For assembling, the upper bearing 17, after insertion of the kingpin 3 into the bore of the axle member 1 and into the inner ring 23 of the bearing, is fixed by means of the nut 24, which is tightened so that the inner ring 23 is locked against the surface 6 of the member 1. In the example shown in the FIGURE, there is a narrow gap "a" between the downwardly facing surface 27 of the upper yoke arm 13 and the opposite surface 6 on the member and a larger gap "b" between the upwardly facing surface 28 of the lower yoke arm 15 and the opposite surface 10 on the member. The lower nut 26 is thereafter tightened with a tightening torque which provides the desired preloading. It is selected so that there will be no gap in the lower bearing at the maximum permissible front axle pressure for the vehicle.

As can be seen in the FIGURE, the described bearing arrangement provides a long moment arm for taking up lateral forces. This moment arm is represented by the distance from the intersection point "c" between a line "d" perpendicular to the rotational axes of the upper bearing rollers and the kingpin axis "e" down to the point of intersection "f" between a line "g" perpendicular to the rotational axes of the lower bearing rollers and the kingpin axis "e".

The bearing seats 15,16 continue into seats 30, 31 for upper and lower sealing rings 32 and 33, respectively, which bridge the gaps "a" and "b". Together with upper and lower covers 34 and 35, respectively, fixed to the yokes and sealing over the bearings 17,18, sealed spaces are obtained for lubricant.

We claim:

1. Steering axle arrangement for a non-driven steerable vehicle wheel, comprising a kingpin with a middle portion, which is fixed in a bore in an axle member, and with cylindrical ends extending above and below upper and lower surfaces of the axle member, a steering knuckle provided with an axle end for a wheel hub, and upper and lower taper roller bearings received in upper and lower bearing seats in the steering knuckle, in which said roller bearing's cylindrical ends are mounted, the steering knuckle (12) having an upwardly facing supporting surface (20) for the outer ring (19) of the upper bearing (17) and a downwardly facing supporting surface (22) for the outer ring (21) of the lower bearing (18), characterized in that the upper bearing (17) has an inner ring (23) which is fixed against the upper surface (6) of the axle member (1), that the steering knuckle is journalled with a gap (b) between a lower surface (10) of the axle member (1) and an opposite steering knuckle surface (28) and that the bearings are preloaded towards each other by means of tightening elements (24, 26) abutting against the inner rings (23, 25) and fixed to said cylindrical ends (5, 9).

2. Steering axle arrangement according to claim 1, characterized in that said cylindrical ends (5, 9) have threaded end portions (7,11), and that the tightening elements are nuts (24, 26) screwed onto said end portions.

3. Steering axle arrangement according to claim 1, characterized in that the kingpin (3) has a conical middle portion (4) which is received in a conical bore (2) in the axle member (1).

4. Steering axle arrangement according to claim 1, characterized in that the steering knuckle (12) is mounted so that there is an upper and a lower gap (a,b) between said upper and lower surfaces (6, 10) on the axle member (1) and the facing upper and lower surfaces (27, 28) of the steering knuckle, and that upper and lower sealing rings (32, 33) bridge said gaps.

* * * * *